United States Patent [19]

Rydbeck et al.

[11] Patent Number: 5,930,718
[45] Date of Patent: Jul. 27, 1999

[54] APPARATUS AND METHOD FOR TRANSMITTING AND RECEIVING A SIGNALING MESSAGE IN A COMMUNICATION SYSTEM

[75] Inventors: Nils Rutger Carl Rydbeck; Sandeep Chennakeshu, both of Cary, N.C.

[73] Assignee: Ericsson Inc.

[21] Appl. No.: 08/646,431

[22] Filed: May 7, 1996

[51] Int. Cl.⁶ .............................. H04Q 7/20; H04B 7/00
[52] U.S. Cl. ........................... 455/458; 455/69; 455/430; 455/515
[58] Field of Search ................................. 455/458, 427, 455/428, 515, 13.2, 31.2, 31.3, 504, 38.2, 384, 567, 13.4, 8–10, 63, 422, 403, 69, 67.1, 127, 115, 226.2, 430

[56] References Cited

U.S. PATENT DOCUMENTS

| | | | |
|---|---|---|---|
| 5,119,397 | 6/1992 | Dahlin et al. | 375/216 |
| 5,175,758 | 12/1992 | Levanto et al. | 455/558 |
| 5,239,668 | 8/1993 | Davis | 455/558 |
| 5,258,751 | 11/1993 | DeLuca et al. | 455/38.4 |
| 5,392,451 | 2/1995 | Schwendeman et al. | 455/13.4 |
| 5,465,399 | 11/1995 | Oberholtzer et al. | 455/69 |
| 5,594,776 | 1/1997 | Dent | 455/558 |

FOREIGN PATENT DOCUMENTS

| | | |
|---|---|---|
| 0 347 167 A2 | 12/1989 | European Pat. Off. . |
| 0 501 282 A1 | 9/1992 | European Pat. Off. . |
| 0 618 742 A2 | 10/1994 | European Pat. Off. . |
| 2177244 | 1/1987 | United Kingdom . |
| 2253972 | 9/1992 | United Kingdom . |
| WO 89/05009 | 6/1989 | WIPO . |
| WO 91/09473 | 6/1991 | WIPO . |
| WO 96/08941 | 3/1996 | WIPO . |

*Primary Examiner*—Dwayne D. Bost
*Assistant Examiner*—Tracy M. Legree
*Attorney, Agent, or Firm*—James P. Davidson

[57] ABSTRACT

A communication system is disclosed as including a plurality of mobile radio telephones, a control unit for transmitting a signaling message to an intended mobile radio telephone, and at least one paging channel through which the control unit is able to transmit the signaling message at varying margin levels. The control unit initially transmits the signaling message at a specified margin level for a predetermined number of attempts and progressively continues to transmit the signaling message at margin levels greater than the specified margin level until the intended mobile radio telephone receives the signaling message. The mobile radio telephones are able to synchronize to the paging channel, monitor messages on the paging channel when the mobile radio telephone is synchronized thereto, receive messages on the synchronized paging channel, and provide a signal to alert a user of the mobile radio telephone that a message is received through the paging channel at a margin level greater than the specified margin level. The alert signal is provided in the form of a visual indicator, an audible indicator, and/or a vibration mechanism.

77 Claims, 4 Drawing Sheets

APPARATUS AND METHOD FOR TRANSMITTING AND RECEIVING A SIGNALING MESSAGE IN A COMMUNICATION SYSTEM

BACKGROUND OF THE INVENTION

1. Field of the Invention

The present invention relates generally to the transmitting and receiving of a signaling message in a communication system and, in particular, to a communication system including a control unit for transmitting a signaling message at varying margin levels and a plurality of mobile radio telephones which provide a signal to alert a user thereof when a signaling message is received through a paging channel having a margin level greater than a specified margin level.

2. Description of Related Art

The present invention relates to a communication system and the manner in which a mobile radio telephone is signaled by the system that a message is pending for reception. For example, a satellite communication system will generally include a land-based control unit for formatting a signaling message and a land earth station (known as an LES) which receives the signaling message from the control unit. The LES then transmits the signaling message to a mobile satellite phone by means of a paging channel via an intermediate satellite. Under advantageous conditions, the mobile satellite phone is able to acquire synchronization to the paging channel. At other times, such as when the phone antenna is not deployed or the phone is shadowed inside a building, the mobile satellite phone is unable to acquire synchronization.

While it is possible for a paging channel to be provided which has a higher than normal margin level, this generally stems from an increase in power which consumes valuable resources of the satellite communication system. Another disadvantage of using such a high margin paging channel is that the mobile satellite phone is usually unable to reliably acknowledge any signaling message received because of insufficient link margin. This results from the limited peak transmit power of the mobile satellite phone, which is inadequate to provide the reverse-link equivalent of such a high margin paging channel.

Several techniques for addressing these problems have been disclosed in a series of patent applications by the owner of the present invention. These patent applications are entitled "High-Penetration Transmission Method For A Radiocommunication System" (Ser. No. 08/559,692), "High-Penetration Transmission Method For A Radiocommunication System" (Ser. No. 08/579,015), "High Power Short Message Service Using Dedicated Carrier Frequency" (Ser. No. 08/588,507), and "High Power Short Message Service Using TDMA Frames" (Ser. No. 08/578,945), each of which are also owned by the assignee of the present invention and hereby incorporated by reference. The prior identified patent applications are suitable for their intended purposes, but the present invention further provides an approach which involves transmission and/or receipt of the signaling message in the communication system.

In light of the foregoing, a primary objective of the present invention is to provide a mobile radio telephone which generates a signal to alert the user thereof when a message is received other than through a normal paging channel.

Another object of the present invention is to provide a mobile radio telephone which generates a variety of different signals to alert the user thereof when a signaling message is received other than through a normal paging channel.

A further object of the present invention is to provide a mobile radio telephone which permits the user thereof to select the type of alerting signal generated when a signaling message is received other than through a normal paging channel.

Yet another object of the present invention is to provide a mobile radio telephone which transmits an acknowledgment signal when it receives a signaling message through the normal paging channel.

Still another object of the present invention is to provide a mobile radio telephone which generates a signal to alert the user thereof when it receives a signaling message through a paging channel having a higher margin level than the normal paging channel.

It is another object of the present invention to provide a mobile radio telephone which is able to distinguish between a plurality of paging channels having distinct margin levels.

An object of the present invention is to provide a mobile radio telephone which generates a signal to alert a user thereof when it receives a signaling message through a paging channel having a margin level greater than a specified margin level.

Another object of the present invention is to provide a method of alerting a user of a mobile radio telephone when a signaling message is received through a paging channel other than the normal paging channel.

A further object of the present invention is to provide a method of alerting a user of a mobile radio telephone when a signaling message is received through a paging channel having a margin level greater than a specified margin level.

It is another object of the present invention to provide a control unit for a communication system which is able to transmit a signaling message at varying margin levels to a mobile radio telephone.

Another object of the present invention is to provide a control unit for a communication system which exchanges messages with a mobile radio telephone upon receipt of an acknowledgment signal from the mobile radio telephone indicating receipt of a signaling message from the control unit at a specified margin level.

Still another object of the present invention is to provide a control unit for a communication system which is able to transmit a signaling message at varying margin levels to a mobile radio telephone via a single paging channel.

Yet another object of the present invention is to provide a control unit for a communication system which is able to transmit a signaling message at varying margin levels to a mobile radio telephone via a plurality of paging channels in which each paging channel has a distinct margin level.

Another object of the present invention is to provide a method of transmitting a signaling message between a control unit of a communication system and a mobile radio telephone at increasing margin levels until the mobile radio telephone receives the signaling message.

A further object of the present invention is to provide a communication system including a control unit for transmitting a signaling message at increasing margin levels to a mobile radio telephone thereof until the mobile radio telephone receives the signaling message.

These objects and other features of the present invention will become more readily apparent upon reference to the following description when taken in conjunction with following drawing.

SUMMARY OF THE INVENTION

In accordance with one aspect of the present invention, a mobile radio telephone is provided which includes means for synchronizing the mobile radio telephone to a normal paging channel and at least one additional paging channel, means for monitoring messages on the paging channel to which the mobile radio telephone is synchronized, means for receiving messages on the synchronized paging channel, and means for providing a signal to alert a user of the mobile radio telephone when a message is received through a paging channel other than the normal paging channel. The alert signal providing means includes a transducer driver connected to a visual indicator, an audible indicator, and/or a vibration mechanism. The normal paging channel preferably will have a lower margin level than the additional paging channels.

In accordance with a second aspect of the present invention, a mobile radio telephone is provided which includes means for synchronizing the mobile radio telephone to a paging channel of a communication system having varying levels of margin, means for monitoring messages on the paging channel at the margin level in which the mobile radio telephone is synchronized thereto, means for receiving messages through the paging channel at the synchronized margin level, and means for providing a signal to alert a user of the mobile radio telephone when a signaling message is received through the paging channel at a synchronized margin level greater than a specified margin level. The alert signal providing means includes a transducer driver connected to a visual indicator, an audible indicator, and/or a vibration mechanism.

In accordance with a third aspect of the present invention, a mobile satellite phone is disclosed as having a main housing, a signal processing circuit located inside the main housing, and an antenna coupled to the signal processing circuit for receiving signals from and transmitting signals to a paging channel. The signal processing circuit is utilized to operate the mobile satellite phone in a satellite mode of communication and includes means for synchronizing the mobile satellite phone to a first paging channel and at least one alternative paging channel having a higher margin level than the first paging channel, means for monitoring messages on the first paging channel and the alternative paging channel when the mobile satellite phone is synchronized with one of such respective paging channels, means for receiving messages through the first paging channel and the alternative paging channel when monitoring such respective paging channels, and means for providing a signal to alert a user of the mobile satellite phone that a signaling message is received through the alternative paging channel. The signal processing circuit of the mobile satellite phone also may include means for transmitting an acknowledgment signal when the mobile satellite phone receives the signaling message through the first paging channel.

In a fourth aspect of the present invention, a method is disclosed which alerts a user of a mobile radio telephone when a signaling message is received other than through a specified paging channel. The method includes the steps of synchronizing the mobile radio telephone to one of a plurality of paging channels, monitoring messages on the paging channel to which the mobile radio telephone is synchronized, receiving messages on the synchronized paging channel, and alerting the user of the mobile radio telephone when the signaling message is received through a paging channel other than the specified paging channel. The user of the mobile radio telephone is alerted by a visual indicator, an audible indicator, and/or a vibration mechanism. The specified paging channel is a paging channel having a designated margin level, with the margin level of all other paging channels having a margin level greater than the designated margin level. The method may also include the step of attempting to acquire synchronization to the specified paging channel subsequent to synchronization to any other of the paging channels.

In accordance with a fifth aspect of the present invention, a control unit for a communication system including a plurality of mobile radio telephones is disclosed. The control unit includes a first means for transmitting a signaling message at a first margin level to an intended mobile radio telephone via a first paging channel, means for determining whether the intended mobile radio telephone is synchronized to the first paging channel, a second means for transmitting the signaling message at a margin level greater than the first margin level, and means for exchanging messages with the intended mobile radio telephone upon synchronization of the intended mobile radio telephone to the first paging channel at the first margin level.

In a sixth aspect of the present invention, a method of transmitting a signaling message between a control unit and a plurality of mobile radio telephones in a communication system is disclosed. The method includes the steps of transmitting the signaling message by the control unit via a first paging channel at a first margin level to one of the mobile radio telephones, determining whether the mobile radio telephone is synchronized to the first paging channel, transmitting the signaling message at a margin level greater than the first margin level when synchronization to the first paging channel by the mobile radio telephone has not occurred within a predetermined number of transmission attempts by the control unit at the first margin level, and exchanging messages between the control unit and the mobile radio telephone upon synchronization to the first paging channel by the mobile radio telephone.

In a seventh aspect of the present invention, a communication system is disclosed as including a plurality of mobile radio telephones, a control unit for transmitting a signaling message to an intended mobile radio telephone, and at least one paging channel through which the control unit is able to transmit the signaling message at varying margin levels. The control unit initially transmits the signaling message at a specified margin level for a predetermined number of attempts and progressively continues to transmit the signaling message at margin levels greater than the specified margin level until the intended mobile radio telephone receives the signaling message.

BRIEF DESCRIPTION OF THE DRAWING

While the specification concludes with claims particularly pointing out and distinctly claiming the present invention, it is believed the same will be better understood from the following description taken in conjunction with the accompanying drawing in which:

DETAILED DESCRIPTION OF THE INVENTION

With respect to the present invention, it will be understood that the term "mobile radio telephone" encompasses telephones which operate in a cellular and/or satellite mode of communication, as well as land mobile radios. The principal type of information communicated will generally be voice, but other kinds of information include data, paging, and high power paging. Therefore, while the invention will be described in greater detail herein with regard to voice communication in a satellite communication system, it should not be deemed limited thereby.

Figure 1:
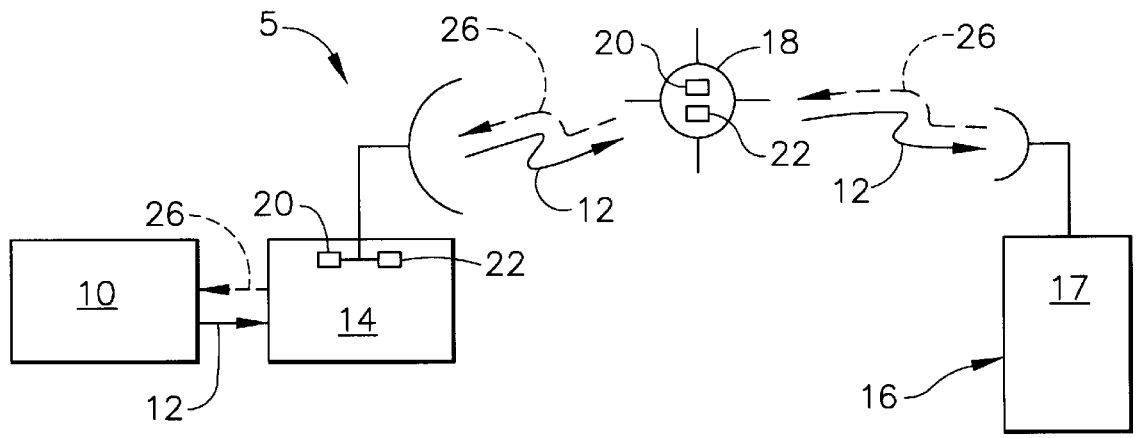
FIG. 1 is a schematic diagram of a satellite communication system in accordance with the present invention.

Referring now to the drawing in detail, wherein identical numerals indicate the same elements throughout the figures, FIG. 1 depicts schematically a satellite communication system (designated generally by the numeral 5) which includes a land-based control unit 10 for formatting and transmitting a signaling message 12 to a land earth station (LES) 14. LES 14 then transmits signaling message 12 to a mobile satellite phone 16 by means of a satellite 18.

More specifically, LES 14 transmits signaling message 12 through a normal paging channel 20 (defined as a paging channel having a margin level to which mobile satellite phone 16 is able to synchronize during normal operating and environmental conditions—approximately 8 dB or less) or an alternative paging channel 22. Preferably, alternative paging channel 22 (and any other alternative paging channels provided) are distinguished from normal paging channel 20 by a relatively higher margin level, thereby providing improved signal reception by mobile satellite phone 16 (e.g., on the order of 5–40 dB). By "margin," it is meant the amount of link margin available through a paging channel. It will be understood that differences in margin stem from such factors as distinctions in power level, format, and modulation technique, as well as variations in antennas or patterns thereof. Of course, the type of repeater device in the communication system and the manner in which it apportions its resources is an additional factor. Accordingly, the way in which different margin levels are attributed to the various paging channels is not imperative in the present invention, but merely the fact that such margin differences exist between such paging channels.

Figure 3:
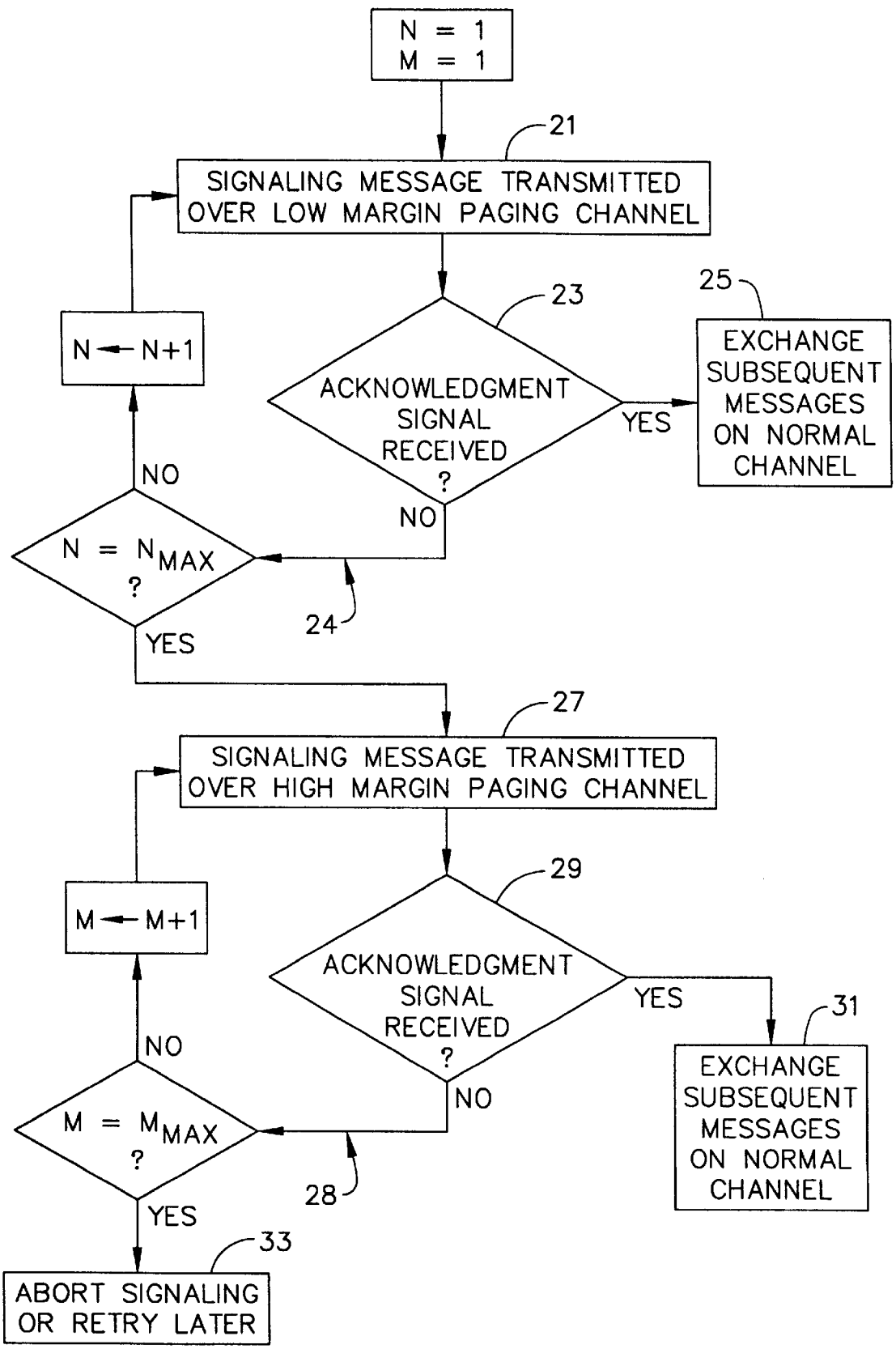
FIG. 3 is a flow chart depicting the protocol used by the control unit in FIG. 1 to transmit messages to the mobile radio telephone.

It will be understood that it is desirable for signaling message 12 to be received by mobile satellite phone 16 via normal paging channel 20 in order to conserve the limited power resources available to satellite 18. Accordingly, as illustrated by the flow chart in FIG. 3, the protocol utilized by control unit 10 involves transmitting signaling message 12 at a low power level as indicated by box 21. In this way, communication with mobile satellite phone 16 is attempted first by means of normal paging channel 20. Signaling message 12 will be transmitted a predetermined number of times in this manner, as indicated by feedback loop 24 and the designation $N_{max}$.

If mobile satellite phone 16 synchronizes to normal paging channel 20, and subsequently receives signaling message 12, an acknowledgment signal 26 will preferably be transmitted from mobile satellite phone 16 back to control unit 10 (as discussed in more detail herein). Subsequent to the transmission of signaling message 12, then, control unit 10 continuously inquires as to whether it has received acknowledgment signal 26 (represented by decision block 23). Provided acknowledgment signal 26 is received by control unit 10, subsequent messages will be exchanged between control unit 10 and mobile satellite phone 16 (as seen in block 25). If acknowledgment signal 26 has not been received by control unit 10 within the maximum prescribed number of low power signaling attempts $N_{max}$, control unit 10 will attempt to signal mobile satellite phone 16 by means of high power signaling (indicated by box 27) through alternative paging channel 22 or some other paging channel that provides higher link margin than normal paging channel 20. These higher margin transmissions of signaling message 12 from control unit 10 are also made only a predetermined number of times $M_{max}$, as indicated in feedback loop 28 in FIG. 3.

Figure 4A:
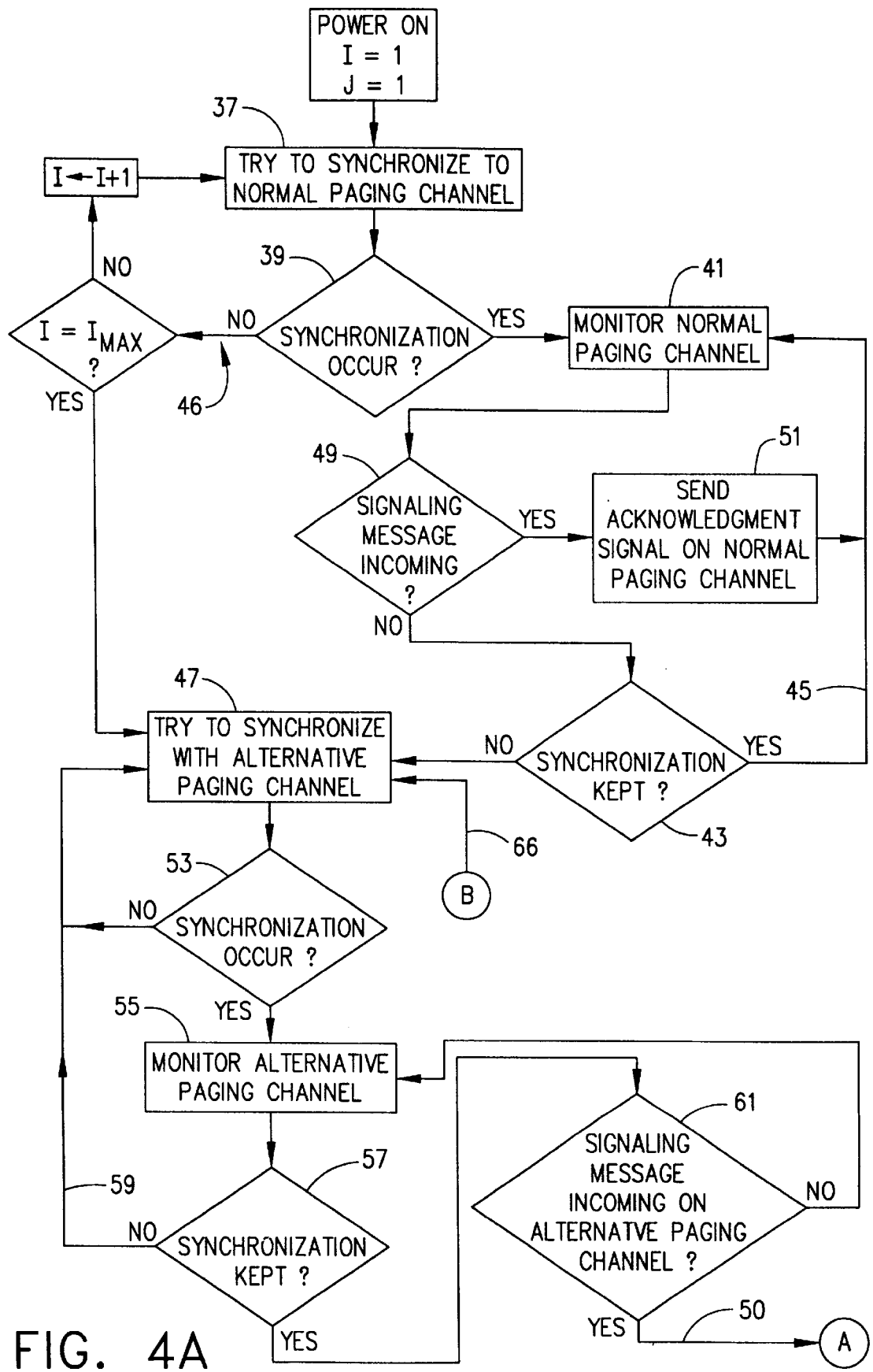
FIGS. 4A and 4B are a flow chart depicting the protocol used by the mobile radio telephone shown in FIG. 2 to monitor incoming messages and provide a signal alerting a user thereof when messages are received from a paging channel other than a normal paging channel.
Figure 4B:
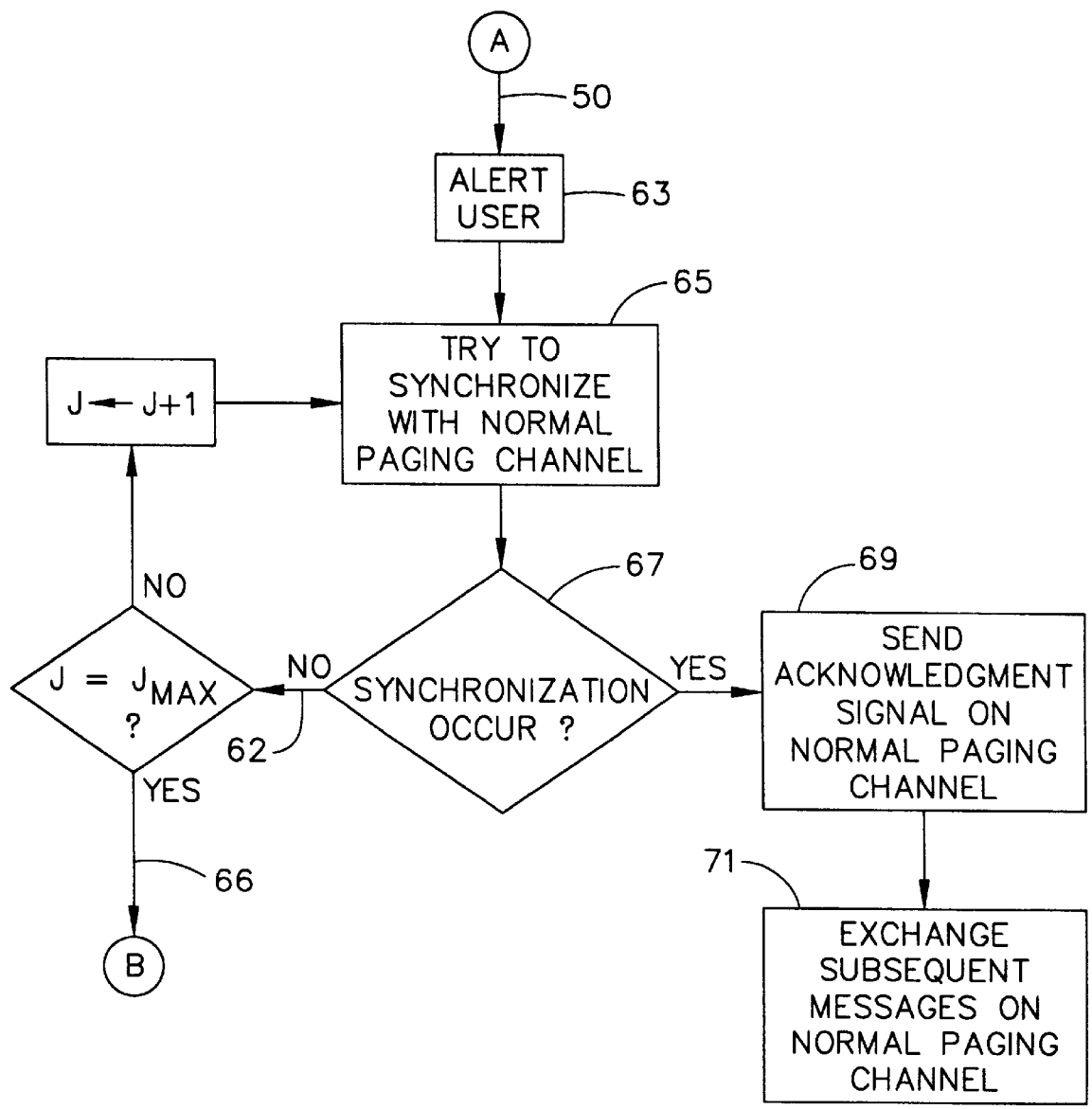

Even if signaling message 12 reaches mobile satellite phone 16 via alternative paging channel 22 within the prescribed number of high margin signaling attempts $M_{max}$ by control unit 10, mobile satellite phone 16 will continue to attempt synchronization to normal paging channel 20 (as described hereafter with respect to FIG. 4B). Provided this happens, which occurs as a consequence of corrective action taken by the user of mobile satellite phone 16 (e.g., proper positioning of mobile satellite phone 16 or the antenna thereof), acknowledgment signal 26 is transmitted by mobile satellite phone 16 and received by control unit 10 as stated above. Accordingly, subsequent messages are permitted to be exchanged between control unit 10 and mobile satellite phone 16 (represented by block 31). Control unit 10 therefore continues to determine whether acknowledgment signal 26 is received (see decision block 29). If acknowledgment signal 26 still is not received by control unit 10, it will either abort further attempts to transmit signaling message 12 or retry later (see block 33). Of course, it will be understood that several alternative paging channels may be utilized by control unit 10 until signaling message 12 is received by mobile satellite phone 16, with each such paging channel having incremental increases in margin level. Alternatively, control unit 10 may utilize only a single paging channel in which the margin level may be varied.

Figure 2:
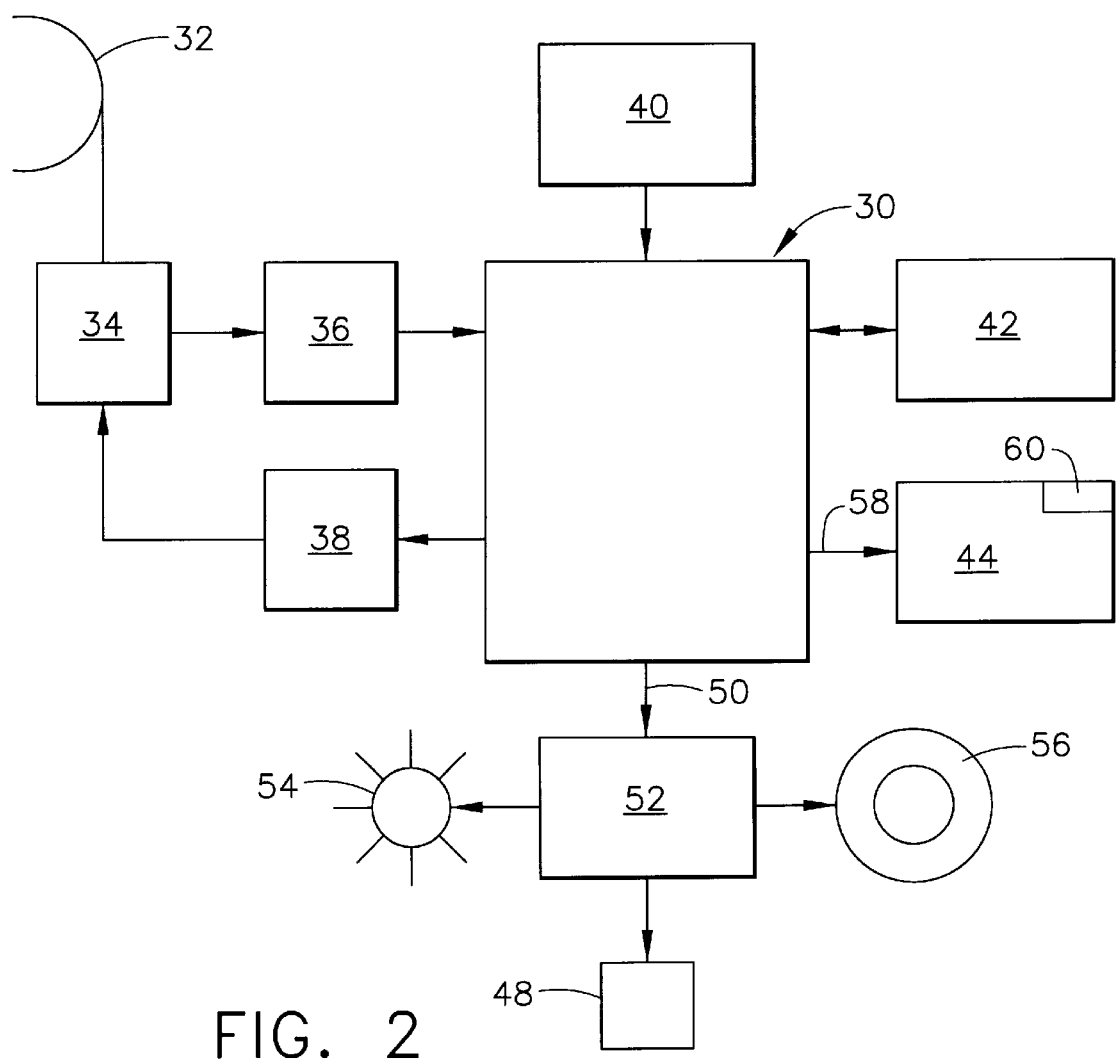
FIG. 2 is a schematic diagram of a portion of the mobile radio telephone shown in FIG. 1.

It will be seen in FIG. 2 that a signal processing circuit 30 is provided to operate mobile satellite phone 16 in a satellite mode of communication. Signal processing circuit 30 is located within a main housing 17 (see FIG. 1) of mobile satellite phone 16 and coupled to an antenna 32 by means of a duplexor or transmit-receive switch 34. Appropriate receiving circuitry 36 and transmitting circuitry 38 are provided in mobile satellite phone 16 and connected to duplexor 34, enabling mobile satellite phone 16 to both receive and transmit signals through antenna 32. Of course, separate transmit and receive antennas may be provided, which would obviate the need for duplexor 34. It will be noted that signal processing circuit 30 is also connected to a keypad 40, a memory device 42, and a display 44 associated with mobile satellite phone 16.

Most importantly, it will be understood that signal processing circuit 30 enables mobile satellite phone 16 to synchronize to normal paging channel 20 and alternative paging channel 22 when sufficient link margin is available. The ability of mobile satellite phone 16 to obtain synchronization to normal paging channel 20 depends on the physical location of mobile satellite phone 16, as well as the orientation of antenna 32. As seen in FIG. 4A, mobile satellite phone 16 attempts to initially synchronize to normal paging channel 20 (indicated by block 37). Accordingly, signal processing circuit 30 in mobile satellite phone 16 constantly determines whether synchronization has occurred (see decision block 39). If successful, mobile satellite phone 16 monitors normal paging channel 20 for signaling messages 12 (block 41). It will also be determined by mobile satellite phone 16 if such synchronization is maintained (decision block 43). If so, mobile satellite phone 16 continues to monitor normal paging channel 20 for messages via a feedback loop 45; otherwise, it attempts to synchronize to alternative paging channel 22 or some other higher margin paging channel (represented in block 47).

Once synchronization has been established, an inquiry preferably is made regarding whether a signaling message is received or not (shown in decision block 49). If the answer is positive, then acknowledgment signal 26 will be transmitted (indicated by block 51) and mobile satellite phone 16 will continue to monitor normal paging channel 20. Should a signaling message not be incoming, no acknowledgment signal is transmitted and mobile satellite phone 16 merely verifies that synchronization to normal paging circuit 20 has been maintained (pursuant to decision block 43 identified previously herein).

It will be noted that mobile satellite phone also will attempt to synchronize to alternative paging channel 22 (see block 47 identified above) after a given number of unsuccessful attempts to synchronize to normal paging channel 20 (indicated by the designation $I_{max}$ in feedback loop 46). Accordingly, mobile satellite phone 16 constantly determines whether synchronization occurs in this manner (decision block 53). If so, then mobile satellite phone 16 monitors alternative paging channel 22 for further messages and verifies whether the synchronization is maintained (represented by block 55 and decision block 57, respectively). When synchronization to alternative paging channel 22 does not occur or is not maintained, mobile satellite phone 16 again attempts synchronization to alternative paging channel 22 as provided for by feedback loop 59.

Provided synchronization to alternative paging channel 22 is maintained, mobile satellite phone 16 next determines whether any messages are received from alternative paging channel 22 (see decision block 61). If answered in the negative, mobile satellite phone 16 continues to monitor paging channel 22 (block 55). If mobile satellite phone 16 finds that messages are received on alternative paging channel 22, it then sends a signal 50 to the user of mobile satellite phone 16 which alerts him to this fact (as represented by block 63). In particular, it will be seen in FIG. 2 that signal 50 is sent to a transducer driver 52, which is connected to a visual indicator 54 (e.g., a light emitting diode of a specified color), an audible indicator 56 (e.g., an alarm), and/or a vibration mechanism 48 (i.e., a device causing housing 17 of mobile satellite phone 16 to vibrate). A signal 58 may also be sent to display 44 so that an alerting icon 60 appears thereon.

It should be understood that the alert signal given the user of mobile satellite phone 16 by any or all of the above-enumerated ways indicates that mobile satellite phone 16 and/or antenna 32 thereof are in a disadvantageous position (i.e., one in which synchronization with normal paging channel 20 cannot be obtained). This will signify to the user that some remedial action on his part is required to obtain synchronization to such normal paging channel 20, such as reorienting antenna 32 into a favorable position or moving mobile satellite phone 16 adjacent the window of a building. Of course, it will be understood that the user may choose which type(s) of alerting signal to be received through signal 50 and transducer driver 52 by programming signal processing circuit 30 with keypad 40.

Once the user of mobile satellite phone 16 has been alerted to the situation, mobile satellite phone 16 will again attempt to synchronize to normal paging channel 20 (shown in block 65 in FIG. 4B) a specified number of times (indicated by $J_{max}$ in feedback loop 62). Mobile satellite phone 16 determines whether such synchronization has occurred, as indicated by decision block 67. If synchronization with normal paging channel 20 occurs, mobile satellite phone 16 transmits acknowledgment signal 26 to control unit 10 (per block 69) and subsequent messages are exchanged on normal paging channel 20 (block 71). If synchronization with low power paging channel 20 is not accomplished within the prescribed number of iterations, however, then a return loop 66 causes mobile satellite phone 16 to again attempt synchronization to alternative paging channel 22 (block 47).

According to mobile satellite phone 16 and the process implemented thereby, a user thereof is alerted when messages are received on a paging channel other than normal paging channel 20. It will be understood that the margin levels at which normal paging channel 20 and alternative paging channel 22 operate are determined by a number of factors relating to satellite 18 and mobile satellite phone 16. Nevertheless, it will be recognized by those skilled in the art that a distinct difference in link margin will exist between normal paging channel 20 and alternative paging channel 22. In fact, any number of alternative paging channels may be implemented in addition to alternative paging channel 22, with mobile satellite phone 16 being designed to determine when an alert signal should be provided to the user thereof due to receipt of messages other than through normal paging channel 20.

Mobile satellite phone 16 may also be programmed so that acknowledgment signal 26 will be transmitted to control unit 10 only when it receives signaling message 12 at (or below) a specified margin level. In this way, a single paging channel having a variable margin level may be used. Also, alternative paging channels having a higher margin level than normal paging channel 20, but less than the specified margin level, may initiate transmission of acknowledgment signal 26.

Having shown and described the preferred embodiment of the present invention, further adaptations of communication system 5, control unit 10 and mobile satellite phone 16 (as well as signal processing circuit 30 thereof) can be accomplished by appropriate modifications by one of ordinary skill in the art without departing from the scope of the invention. For example, if a plurality of paging channels is provided with distinct link margins associated therewith, mobile satellite phone 16 may provide the alerting signal when synchronization has occurred with a paging channel having a specified link margin level. In addition, adaptations may be made in the steps of the method for alerting a mobile satellite phone user and the method for transmitting a signaling message as described by the present invention.

What is claimed is:

1. A mobile radio telephone, comprising:
    (a) means for synchronizing said mobile radio telephone to a normal paging channel and at least one additional paging channel of a communication system;
    (b) means for monitoring messages on the paging channel to which said mobile radio telephone is synchronized;
    (c) means for receiving messages through said synchronized paging channel; and
    (d) means for providing a signal to alert a user of said mobile radio telephone when a signaling message is received through a paging channel other than said normal paging channel.

2. The mobile radio telephone of claim 1, said alert signal providing means comprising a transducer driver connected to a visual indicator.

3. The mobile radio telephone of claim 1, said alert signal providing means comprising a transducer driver connected to an audible indicator.

4. The mobile radio telephone of claim 1, said alert signal providing means comprising a transducer driver connected to a vibration mechanism.

5. The mobile radio telephone of claim 1, further comprising means for providing an alerting icon to a display of said mobile satellite phone when said alert signal providing means is activated.

6. The mobile radio telephone of claim 1, further comprising means for transmitting an acknowledgment signal through said synchronized paging channel indicating receipt of said signaling message from said communication system through said normal channel.

7. The mobile radio telephone of claim 1, wherein said normal paging channel has a lower margin level than said additional paging channels.

8. The mobile radio telephone of claim 1, wherein said synchronizing means continuously attempts to acquire synchronization to one of said paging channels.

9. The mobile radio telephone of claim 1, further comprising means for continuously verifying whether synchronization to one of said paging channels is maintained.

10. The mobile radio telephone of claim 1, wherein said monitoring means is activated upon synchronization to one of said paging channels.

11. The mobile radio telephone of claim 1, wherein said mobile radio telephone remains synchronized to said additional paging channel for a limited time period.

12. The mobile radio telephone of claim 1, said synchronizing means initially making a predetermined number of attempts to acquire synchronization to said normal paging channel.

13. The mobile radio telephone of claim 12, said synchronizing means making a predetermined number of attempts to acquire synchronization to said additional paging channel subsequent to said predetermined number of attempts to synchronize to said normal paging channel.

14. The mobile radio telephone of claim 13, said synchronizing means again attempting to acquire synchronization to said normal paging channel subsequent to synchronization to said additional paging channel.

15. The mobile radio telephone of claim 1, wherein said mobile radio telephone operates in a cellular mode of communication.

16. The mobile radio telephone of claim 1, wherein said mobile radio telephone operates in a satellite mode of communication.

17. The mobile radio telephone of claim 1, wherein said mobile radio telephone is a land mobile radio.

18. A mobile radio telephone, comprising:
  (a) means for synchronizing said mobile radio telephone to a paging channel of a communication system having varying levels of margin;
  (b) means for monitoring messages on said paging channel at the margin level in which said mobile radio telephone is synchronized thereto;
  (c) means for receiving messages through said paging channel at the synchronized margin level; and
  (d) means for providing a signal to alert a user of said mobile radio telephone when a signaling message is received through said paging channel at a synchronized margin level greater than a specified margin level.

19. The mobile radio telephone of claim 18, said alert signal providing means comprising a transducer driver connected to a visual indicator.

20. The mobile radio telephone of claim 18, said alert signal providing means comprising a transducer driver connected to an audible indicator.

21. The mobile radio telephone of claim 18, said alert signal providing means comprising a transducer driver connected to a vibration mechanism.

22. The mobile radio telephone of claim 18, further comprising means for providing an alerting icon to a display of said mobile radio telephone when said alert signal providing means is activated.

23. The mobile radio telephone of claim 18, further comprising means for transmitting an acknowledgment signal through said paging channel indicating receipt of said signaling message at a margin level no greater than said specified amount.

24. The mobile radio telephone of claim 18, wherein said synchronizing means continuously attempts to acquire synchronization to said paging channel.

25. The mobile radio telephone of claim 18, further comprising means for continuously verifying whether synchronization to said paging channel is maintained.

26. The mobile radio telephone of claim 18, wherein said monitoring means is activated upon synchronization to said paging channel.

27. The mobile radio telephone of claim 18, wherein said mobile radio telephone remains synchronized to said paging channel at a margin level greater than said specified margin level for a limited time period.

28. The mobile radio telephone of claim 18, said synchronizing means initially making a predetermined number of attempts to acquire synchronization to said paging channel at said specified margin level.

29. The mobile radio telephone of claim 28, said synchronizing means making a predetermined number of attempts to acquire synchronization to said paging channel at margin levels incrementally greater than said specified margin level subsequent to said predetermined number of attempts to synchronize to said paging channel at said specified margin level.

30. The mobile radio telephone of claim 29, said synchronizing means again attempting to acquire synchronization to said paging channel at said specified margin level subsequent to synchronization to said paging channel at said margin level greater than said specified margin level.

31. The mobile radio telephone of claim 18, wherein said mobile radio telephone operates in a cellular mode of communication.

32. The mobile radio telephone of claim 18, wherein said mobile radio telephone operates in a satellite mode of communication.

33. The mobile radio telephone of claim 18, wherein said mobile radio telephone is a land mobile radio.

34. A mobile satellite phone, comprising:
  (a) a main housing;
  (b) a signal processing circuit located inside said main housing for operating said mobile satellite phone in a satellite mode of communication, said signal processing circuit further comprising:
    (1) means for synchronizing said mobile satellite phone to a first paging channel and at least one alternative paging channel having a higher margin level than said first paging channel;
    (2) means for monitoring messages on said first paging channel and said alternative paging channel when synchronized with such respective paging channel;

(3) means for receiving messages through said first paging channel and said alternative paging channel when monitoring such respective paging channel; and (4) means for providing a signal to alert a user of said mobile satellite phone when a signaling message is received through said alternative paging channel; and (c) an antenna coupled to said signal processing circuit for receiving signals from and transmitting signals to said paging channels.

35. The mobile satellite phone of claim 34, said signal processing circuit further comprising means for transmitting an acknowledgment signal when said mobile satellite phone receives said signaling message through said first paging channel.

36. The mobile satellite phone of claim 34, said alert signal producing means comprising a transducer driver connected to a visual indicator.

37. The mobile satellite phone of claim 34, said alert signal producing means comprising a transducer driver connected to an audible indicator.

38. The mobile satellite phone of claim 34, said alert signal producing means comprising a transducer driver connected to a vibration mechanism.

39. The mobile satellite phone of claim 34, further comprising means for providing an alerting icon to a display of said mobile satellite phone when said alert signal providing means is activated.

40. In a communication system having a plurality of paging channels with varying margin levels, a method of alerting a user of a mobile radio telephone when a signaling message is received other than through a specified paging channel, said method comprising the steps of:

(a) synchronizing said mobile radio telephone to one of said plurality of paging channels;

(b) monitoring messages on the paging channel to which said mobile radio telephone is synchronized;

(c) receiving messages on said synchronized paging channel; and (d) alerting said user of said mobile radio telephone when said signaling message is received through a paging channel other than said specified paging channel.

41. The method of claim 40, wherein said user is alerted by a visual indicator on said mobile radio telephone.

42. The method of claim 40, wherein said user is alerted by an audible indicator from said mobile radio telephone.

43. The method of claim 40, wherein said user is alerted by vibration of said mobile radio telephone.

44. The method of claim 40, wherein said user is alerted by an alerting icon appearing on a display of said mobile radio telephone.

45. The method of claim 40, further comprising the step of transmitting an acknowledgment signal when said mobile radio telephone is synchronized to said specified paging channel.

46. The method of claim 40, said specified paging channel having a designated margin level, wherein said alternative paging channels have a margin level greater than said designated margin level.

47. The method of claim 40, further comprising the step of continuously verifying whether synchronization to one of said paging channels is maintained.

48. The method of claim 40, wherein said monitoring step is activated upon synchronization to one of said paging channels.

49. The method of claim 40, wherein said mobile radio telephone remains synchronized to a paging channel other than said specified paging channel for a limited time period.

50. The method of claim 40, wherein a predetermined number of attempts to acquire synchronization to said specified paging channel are made initially.

51. The method of claim 40, wherein a predetermined number of attempts to acquire synchronization to a paging channel other than said specified paging channel is made when said predetermined number of attempts to synchronize to said specified paging channel is unsuccessful.

52. The method of claim 51, further comprising the step of attempting to acquire synchronization to said specified paging channel subsequent to synchronization to any of said other paging channels.

53. A control unit for a communication system including a plurality of mobile radio telephones, comprising:

(a) first means for transmitting a signaling message at a first margin level to anintended mobile radio telephone via a first paging channel;

(b) means for determining whether said intended mobile radio telephone is synchronized to said first paging channel;

(c) second means for transmitting said signaling message at a margin level greater than said first margin level, said second transmitting means being automatically activated when synchronization of said intended mobile radio telephone to said first paging channel has not occurred within a predetermined number of transmission attempts by said first transmitting means;

(d) means for exchanging messages with said intended mobile radio telephone upon synchronization of said intended mobile radio telephone to said first paging channel at said first margin level;

(e) means for aborting the transmission of said signaling message by said control unit if synchronization by said mobile radio telephone is not acquired at said greater margin level within a predetermined number of transmission attempts by said second transmission means; and (f) means for retrying transmission of said signaling message by said first and second transmitting means after a predetermined time period.

54. The control unit of claim 53, wherein synchronization of said mobile radio telephone to said first paging channel at said first margin level is indicated by receipt of an acknowledgment signal from said mobile radio telephone.

55. The control unit of claim 54, wherein subsequent messages are exchanged between said control unit and said mobile radio telephone upon receipt of said acknowledgment signal from said mobile radio telephone.

56. The control unit of claim 54, wherein said second transmitting means is automatically activated when said acknowledgment signal has not been received within a predetermined number of transmission attempts by said first transmitting means at said first margin level.

57. The control unit of claim 53, wherein said second transmitting means transmits said signaling message through a second paging channel at said greater margin level.

58. The control unit of claim 57, wherein said first transmitting means will continue transmitting said signaling message via said first paging channel at said first margin level after synchronization of said mobile radio telephone to said second paging channel.

59. The control unit of claim 53, wherein said second transmitting means transmits said signaling message through said first paging channel at said greater margin level.

60. The control unit of claim 53, wherein said communication system operates in a cellular mode of communication and said mobile radio telephones are mobile cellular telephones.

61. The control unit of claim 53, wherein said communication system operates in a satellite mode of communication and said mobile radio telephones are mobile satellite telephones.

62. The control unit of claim 53, wherein said communication system operates in a radio frequency mode of communication and said mobile radio telephones are land mobile radios.

63. The control unit of claim 53, wherein the difference in margin levels between said first and second transmitting means is a function of the power level at which said signaling message is transmitted.

64. The control unit of claim 53, wherein the difference in margin levels between said first and second transmitting means is a function of the format for said signaling message.

65. The control unit of claim 53, said communication system including at least one intermediate station between said control unit and said mobile radio telephone, wherein said control unit transmits said signaling message to said intermediate station and said intermediate station transmits said signaling message to said mobile radio telephone.

66. The control unit of claim 61, said satellite communication system further comprising:
   (a) a land earth station which receives said signaling message from said control unit and retransmits said signaling message at substantially the same margin level transmitted by said control unit; and
   (b) a satellite which receives said retransmitted signaling message from said land earth station and again retransmits said signaling message to said intended mobile radio telephone at substantially the same margin level retransmitted by said land earth station.

67. A method of transmitting a signaling message between a control unit and a plurality of mobile radio telephones in a communication system, said method comprising the following steps:
   (a) transmitting said signaling message by said control unit via a first paging channel at a first margin level to one of said mobile radio telephones;
   (b) determining whether said mobile radio telephone is synchronized to said first paging channel;
   (c) transmitting said signaling message at a margin level greater than said first margin level when synchronization to said first paging channel by said mobile radio telephone has not occurred within a predetermined number of transmission attempts by said control unit at said first margin level;
   (d) exchanging messages between said control unit and said mobile radio telephone upon synchronization to said first paging channel by said mobile radio telephone;
   (e) aborting the transmission of said signaling message by said control unit if said acknowledgement signal is not received within a predetermined number of attempts during said second transmitting step; and
   (f) retrying said first and second transmitting steps after a predetermined time period.

68. The method of claim 67, said synchronization determining step further comprising determining whether said control unit has received an acknowledgment signal from said mobile radio telephone indicating receipt of said signaling message through said first paging channel.

69. The method of claim 68, wherein said message exchanging step occurs when said control unit receives said acknowledgment signal.

70. The method of claim 67, said second transmitting step occurring via a second paging channel.

71. The method of claim 67, said second transmitting step occurring via said first paging channel.

72. A communication system, comprising:
   (a) a plurality of mobile radio telephones;
   (b) a control unit for transmitting a signaling message to an intended mobile radio telephone; and
   (c) at least one paging channel through which said control unit is able to transmit said signaling message at varying margin levels, wherein said control unit initially transmits said signaling message at a specified margin level for a predetermined number of attempts and automatically continues to transmit said signaling message at margin levels progressively greater than said specified margin level until said intended mobile radio telephone receives said signaling message;
wherein each said mobile telephone further includes means for monitoring messages on a paging channel to which said mobile radio telephone is synchronized and means for providing a signal to alert a user of said mobile radio telephone when said signaling message is received through a paging channel having a margin level greater than said specified margin level.

73. The communication system of claim 72, further comprising:
   (a) a first paging channel through which said signaling message is transmitted at said specified margin level; and
   (b) at least one alternative paging channel through which said signaling message is automatically transmitted at a margin level greater than said specified margin level.

74. The communication system of claim 73, wherein said mobile radio telephone is able to remain synchronized to one of said alternative paging channels for a limited time period.

75. The communication system of claim 73, wherein said control unit continues to transmit said signaling message on said first paging channel after synchronization of said mobile radio telephone to one of said alternative paging channels.

76. The communication system of claim 72, wherein said signaling message is transmitted through a single paging channel.

77. The communication system of claim 72, said mobile radio telephones including means for transmitting an acknowledgment signal to said control unit upon receipt of said signaling message through said paging channel at said specified margin level.

\* \* \* \* \*